United States Patent [19]
Bealkowski et al.

[11] Patent Number: 5,237,690
[45] Date of Patent: Aug. 17, 1993

[54] SYSTEM FOR TESTING ADAPTOR CARD UPON POWER UP AND HAVING DISABLEMENT, ENABLEMENT, AND RECONFIGURATION OPTIONS

[75] Inventors: Richard Bealkowski, Delray Beach; Reynaldo Davila, Boynton Beach, both of Fla.; Kevin M. Zyvoloski, Raleigh, N.C.

[73] Assignee: International Business Machines Corporation, Armonk, N.Y.

[21] Appl. No.: 549,199

[22] Filed: Jul. 6, 1990

[51] Int. Cl.⁵ .............................................. G06F 1/24
[52] U.S. Cl. ................................ 395/700; 364/942.51; 364/975.2; 364/DIG. 2; 364/280.2
[58] Field of Search .................. 364/DIG. 1, DIG. 2; 395/325, 700

[56] References Cited

U.S. PATENT DOCUMENTS

| 4,321,667 | 3/1982 | Robbins et al. | 395/575 |
| 4,556,953 | 12/1985 | Caprio et al. | 395/325 |
| 4,622,633 | 11/1986 | Ceccon et al. | 395/700 |
| 5,038,320 | 8/1991 | Heath et al. | 395/275 |

Primary Examiner—Thomas C. Lee
Assistant Examiner—Paul R. Lintz
Attorney, Agent, or Firm—G. E. Grosser; D. R. McKechnie

[57] ABSTRACT

A data processing system such as a personal computer includes a plurality of expansion connectors for receiving adapter cards. A non-volatile memory stores programmable option select (POS) data that is stored when the system is configured. A Power On Self Test (POST) operation is performed during which adapters are checked to determine if any have been added, moved or removed, since a previous system configuration. If any have been so altered, the system may be placed in operation with all adapters enabled except for those which were altered.

8 Claims, 6 Drawing Sheets

SYSTEM FOR TESTING ADAPTOR CARD UPON POWER UP AND HAVING DISABLEMENT, ENABLEMENT, AND RECONFIGURATION OPTIONS

FIELD OF INVENTION

This invention relates to the field of data processing and, more particularly, to improvements in method and apparatus for automatically initializing a data processing system, such as a personal computer, so as to allow the system to be operated when feature cards or adapters have been added to, removed from, or moved within the computer system.

BACKGROUND OF THE INVENTION

Commercially available IBM (TM) PS/2 (TM) personal computers constructed in accordance with Micro Channel (TM) architecture, are provided with a Programmable Option Select (POS) function which is used to define or provide settings for the assignment of system resources to a system board and various adapters. The POS Function is generally described in "IBM Personal System/2 Hardware Interface Technical Reference", First Edition (May 1988), published by International Business Machines Corporation, to which reference may be had for a more detailed description thereof.

Adapters provide the means by which various data processing devices or optional features can be connected into and operated as part of a personal computer system. Examples of such features are displays, printers, scanners, etc. In accordance with the above mentioned architecture, an adapter has a group of programmable registers, known as the POS registers, which, by convention, must store or contain predetermined POS information. Two registers store an adapter ID that uniquely identifies the specific adapter relative to other adapters. Four additional registers store an adapter card enabling/disabling bit and option select data, and two additional registers store subaddress extensions. Before an adapter can be used, an adapter description file (ADF) must be created by the supplier of the adapter. The ADF contains data necessary for the operation of the adapter and its related option or device, the data defining the resources the adapter can use, and the associated POS settings that indicate the resource assignment.

Each system includes a Reference Diskette containing System Configuration utilities or programs that identify the installed hardware and interpret the system resources (I/O ports or address space, memory address space, interrupt levels, and arbitration levels) for each device. Normally, the files on the Reference Diskette are copied onto a backup copy which is then used to configure the system. As options are added to the system, the files needed for configuration are merged onto the backup copy. During configuration, certain files are needed, the files being an ADF and any necessary Adapter Description Program (ADP). An option diskette is supplied for each adapter and contains the necessary ADF and ADP. Such files are merged onto the backup copy before a new adapter is installed.

An ADF contains various fields of information including the following: adapter ID; adapter name; the number of POS registers to be included; an optional field indicating that an adapter option will be specified next; a prompt keyword; a choice keyword including the choice name, a POS setting which programs the adapter appropriately, and a resource setting which identifies the resources used for the particular choice; and a help keyword.

In accordance with the prior art, a system such as described above has to be configured when the system is setup for the first time and thereafter each time an adapter is added to, removed from, or moved within the system. When the system is being configured, POS data is stored in a non-volatile memory. Thereafter, whenever the system is turned on, a Power On Self Test (POST) is performed during which the POS data is retrieved from the non-volatile memory and is used to establish the system configuration. Such test also recognizes when an adapter card is added to, removed from, or moved within the system. When this occurs all other feature cards (such as the disk controller adapter) are disabled in the system, and a display message is sent to the operator or user indicating that the system must be reconfigured before it can be further operated.

The obvious drawback of this existing POS sequence is that the addition of any new card to the system (or removal from the system, or simply a change of slot) requires that the system be reconfigured before the system can again be operational. For example, the removal of an asynchronous communications attachment card will cause the hard disk subsystem to be disabled (preventing operating system initialization from the hard disk). Disabling all other devices may not be necessary and may not provide the user with the maximum function possible. This restriction can be removed by the implementation of the invention which allows the system to be operated with the features that are not disabled.

The foregoing describes in general terms the prior art being improved upon, and such prior art is also believed to be the most pertinent or relevant to the invention. However, certain prior art items are also known which describe inventions useful in configuring data processing systems. U.S. Pat. No. 4,070,704- Calle et al, for AUTOMATIC RECONFIGURATION APPARATUS FOR INPUT/OUTPUT PROCESSOR, discloses a system in which all possible memory, I/O, and processor combinations are attempted, in order to automatically reconfigure the system when a bootstrap failure occurs during system startup.

IBM TDB Vol. 20, No.9, February 1973, pp. 3501–3502, discloses a modular relocate scheme in which RAMS are partitioned on a separate card, module, or chip in such a way that a processor will operate with or without a card, module, or chip.

SUMMARY OF THE INVENTION

One of the objects of the invention is to provide a method and apparatus for testing a data processing system, such as a personal computer, and allowing the system to be operated without the system being reconfigured, even though an adapter card has been added to, removed from, or moved within the system.

Another object is to provide a POST which disables non-video adapter cards that have been added to, removed from, or moved within a data processing system, and allows continued operation of the system without requiring reconfiguration.

A further object is to provide a power on test for a personal computer constructed in accordance with the IBM Micro Channel Architecture, after which test the computer can be operated without requiring reconfiguration even though an adapter has been added to, moved within, or removed from the computer.

Still another object is to provide data processing system with a power on test function in which all expansion slots are checked to compare actual adapter IDs with IDs stored during a prior configuration, and set flags in accordance with mismatch errors to allow the system to disable any slots in which a mismatch occurs.

Briefly, in accordance with the invention, a data processing system such as a personal computer includes a Power On Self Test (POST) during which adapter IDs are checked to determine if any adapters have been added, moved or removed, since a previous system configuration. If any adapters have been so altered, the system is placed in operation with all adapters enabled except for those which were altered.

DRAWINGS

Other objects and advantages of the invention will be apparent from the following description taken in connection with the accompanying drawings wherein.

DETAILED DESCRIPTION

Figure 1:
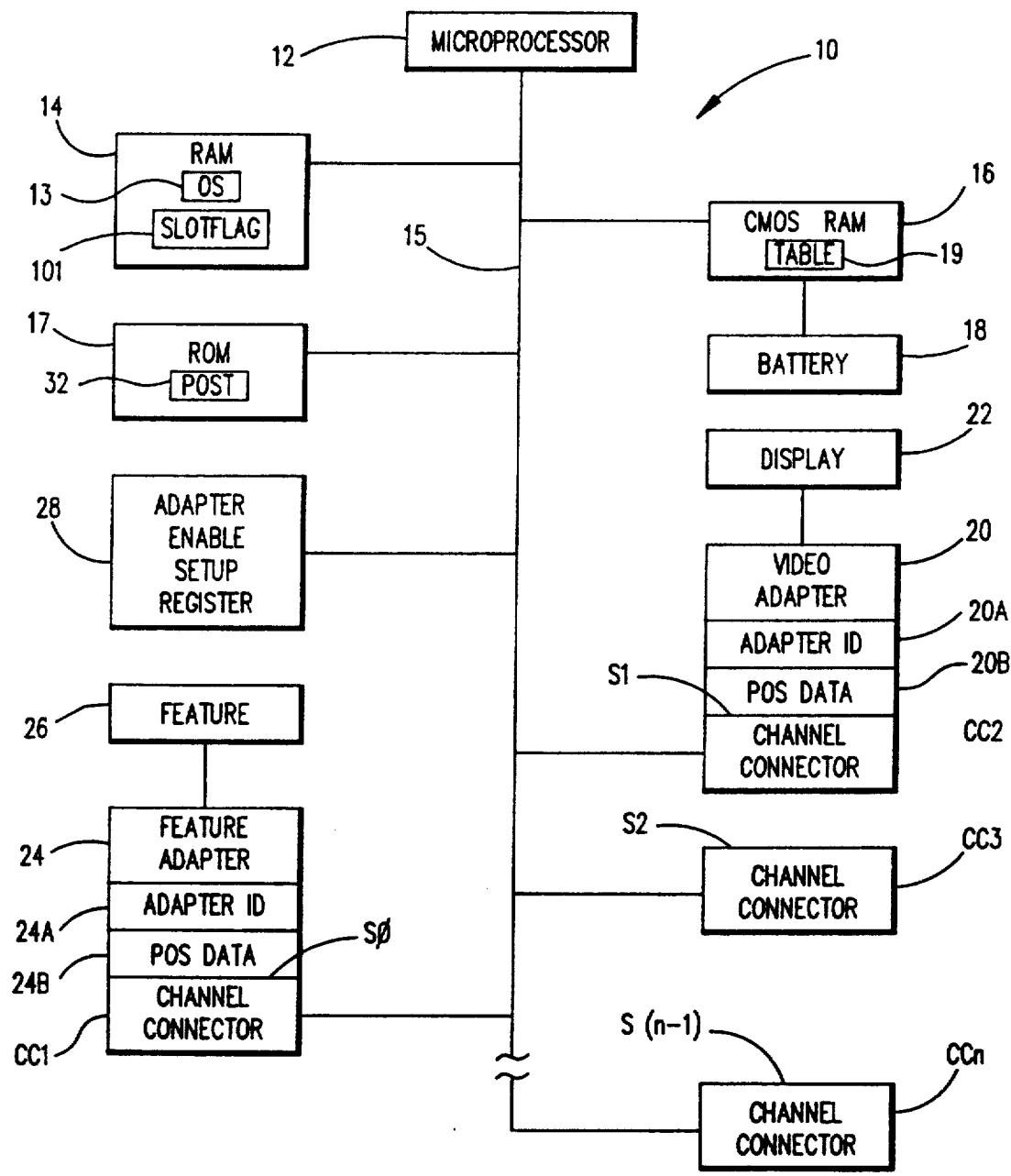
FIG. 1 is a schematic diagram of a data processing system embodying the invention.

Referring now to the drawings, and first to FIG. 1, the invention is embodied in a personal computer system 10, such as an IBM PS/2 computer constructed in accordance with Micro Channel architecture, and resides in the manner in which such computer is programmed and operated. It is to be appreciated that such a computer is complex and includes many components and devices so that the description provided below is limited to only those items which are useful in obtaining an understanding of the invention. System 10 includes a microprocessor 12, such as a commercially available Intel 80386 or 80486 microprocessor, the structure and operation of which are well known to those skilled in the art. Microprocessor 12 executes programs, stored in a random access memory (RAM) 14 and a read only memory (ROM) 17 and controls the general operation of system 10.

System 10 also includes a circuit or bus network 15 operatively interconnecting the various elements of the system. A CMOS (complementary metal oxide semiconductor) RAM 16 is connected to and backed up by a battery 18 and provides a non-volatile storage in a table 19 of information used in the invention as described hereinafter. Table 19 contains a plurality of entries corresponding in number to the number of expansion connectors or slots in the system. The position in the table of each entry corresponds to the slot number for such entry. Each entry contains a first field for storing a two byte configured adapter ID, a second field indicating how many bytes of POS data are in a third field, and a third field for storing the POS data defining the system resources assigned to the adapter identified in the first field. During configuration of the system, the appropriate entries are stored in table 19. A configured adapter ID is either the actual ID of an adapter plugged into the corresponding slot and connector at configuration time, or a pseudo adapter ID indicating that such slot and connector are empty and have no adapter plugged therein. If a slot is empty, a pseudo adapter ID or default value of FFFF(Hex) is stored.

Bus network 15 is further connected to a plurality of channel connectors CC1–CCn. Such connectors are also known as expansion connectors and provide the means by which various devices or optional features can be added to the system. Such connectors are designed to receive adapters or printed circuit boards having edge connectors thereon, the adapters being plugged into slots in the connectors. The terms "adapters", "adapter cards", "feature cards", and "cards" are synonyms used interchangeably herein. Each different connector has a unique slot number Sx, the illustrated connectors being assigned slot numbers S0–S(n-1). A video adapter 20 is plugged into slot S1 of connector CC2 and is connected to a display 22. A feature adapter 24 is plugged into slot S0 of connector CC1 and is connected to a feature 26. The remaining connectors are empty, i.e. not connected to any adapter, and allow additional features to be added. Each adapter has a register A for storing an adapter ID that uniquely identifies the type of adapter, and registers B that store an enabling/disabling bit and POS data, such registers being respectively indicated by the references 20A, 20B, 24A and 24B in FIG. 1. These registers correspond to and are known as the POS registers 0–7 as defined by the above-mentioned Micro Channel architecture. During POST, the POS data from table 19 is written in the respective POS registers of the adapters.

System 10 further includes an adapter enable/setup register 28 connected to bus network 15. Register 28 is an eight bit register in which the bits are numbered 0–7. Bits 0–2 are address bits identifying the connectors by their slot numbers. Bit 3 enables or disables a card setup signal. When enabled during setup, bit 3 allows reading to and writing from the card located in the slot addressed by bits 0–2. Bits 4–6 are not used. Bit 7 is used to activate a channel reset signal sent to all connectors. Register 28 is used to scan or search through all the slots or connectors and read the actual adapter IDs of all adapters plugged into such slots. If a slot is empty, the adapter ID read operation returns a pseudo adapter ID of FFFF(hex), indicating that the slot is empty.

PRIOR ART POST OPERATIONS

The structure and operation of the system as thus far described is in accordance with the prior art, and it is felt that, for a better understanding of the invention, a short description of the prior art POST operation is useful. At the start it is assumed that the system has been correctly configured previously and that power was turned off. When system 10 is subsequently turned on, the prior art POST routine is executed. Such routine performs many different functions and only those necessary to understand the invention will be described. At some point, the POST routine performs the operations shown in FIG. 2. Step 40 initializes register 28 by setting bits 0–2 thereof to "0" to indicate the address of the first slot in the system. Step 42 then sets bit 3 of register 28 to the setup mode thus allowing step 44 to read the adapter ID from the card in slot S0. As illustrated, such action would read the ID of feature adapter 24. Step 46 reads from table 19 the adapter ID from the entry corresponding to the same slot number, and the two IDs thus read are compared in step 48. If they are the same, step 50 reads the corresponding POS data from table 19 and writes it into the appropriate POS registers B of the adapter. Step 52 determines if all slots have been so analyzed. If not, step 54 sets register 28 to the next slot address, and the loop is repeated.

If step 48 determines there is a mismatch, step 58 logs such determination as indicating an ID mismatch error has occurred. The mismatch would occur when there is a different adapter in the slot than when last configured, when there is an adapter in the slot when there was none when last configured, or when there is no adapter in the slot when there was one at the last configuration. Step 58 passes control to step 52. After all slots have been checked, the POST routine continues further operations in step 56. Later, step 60 checks to see if an ID mismatch error occurred. If none did, control is passed to step 62 and the POST routine completes as normal and finally passes control to step 64 which then boots up the operating system and allows step 65 to operate the system with all the optional features.

If an ID mismatch error occurred, step 60 branches to step 66 (FIG. 3) which turns off all the adapters in the system. Steps 70-78 then search through the adapters in the system until the video adapter 20 is located and step 74 iteratively turns off all slots other than the video adapter slot. When the video adapter is found, step 80 initializes it thereby allowing an error message to be sent to the display 22 informing the user of the need to reconfigure the system. Step 80 passes control to step 82 which then finishes off whatever other POST operations need to be done, and control passes to step 84 to send a message to the user indicating a need to reconfigure the system. The system is then reconfigured by powering up the system with the Reference Diskette in step 86 and running the system automatic configuration program in step 87.

Such prior art operations can be summarized as follows. A POS phase of POST is performed or executed during which each feature slot in the system is individually placed into card setup mode. Card setup mode is a special state (as described by the IBM Micro Channel Architecture) which allows a system feature to be configured via software. Each feature card can present its card ID when it is placed in card setup mode. This card ID is read by POST and compared to a value in a table stored in the non-volatile memory, which table is established when the system setup utility is executed. This table has the card ID and POS data information for each feature card slot in the system. If the card ID read from the feature card does not match the card ID stored in the non-volatile memory table then an ID mismatch error is logged and no further action is performed on this particular feature card slot. When the IDs do match then the POS data from the non-volatile memory table is programmed into the adapter card. By programming the POS data into the adapter card, the card is configured.

Later in POST, the ID mismatch error flag is checked to see if an ID mismatch error occurred. If an ID mismatch error occurred, then all slots are disabled and POST searches for a video adapter. All slots are disabled to insure that no addressing conflicts occur if the video adapter is found and enabled. A video adapter, if present, must be initialized to insure that error messages are displayed to the user. If a video adapter is found only the slot that contains the video adapter is enabled. This scheme leaves all cards turned off (except for a possible video card). This forces the user to rerun the IBM setup utility (from the reference diskette) before the adapter cards of the system are allowed to be operational. Once reconfiguration has been performed, the system can be restarted and the operating system loaded from disk.

THE INVENTION

Figure 2A:
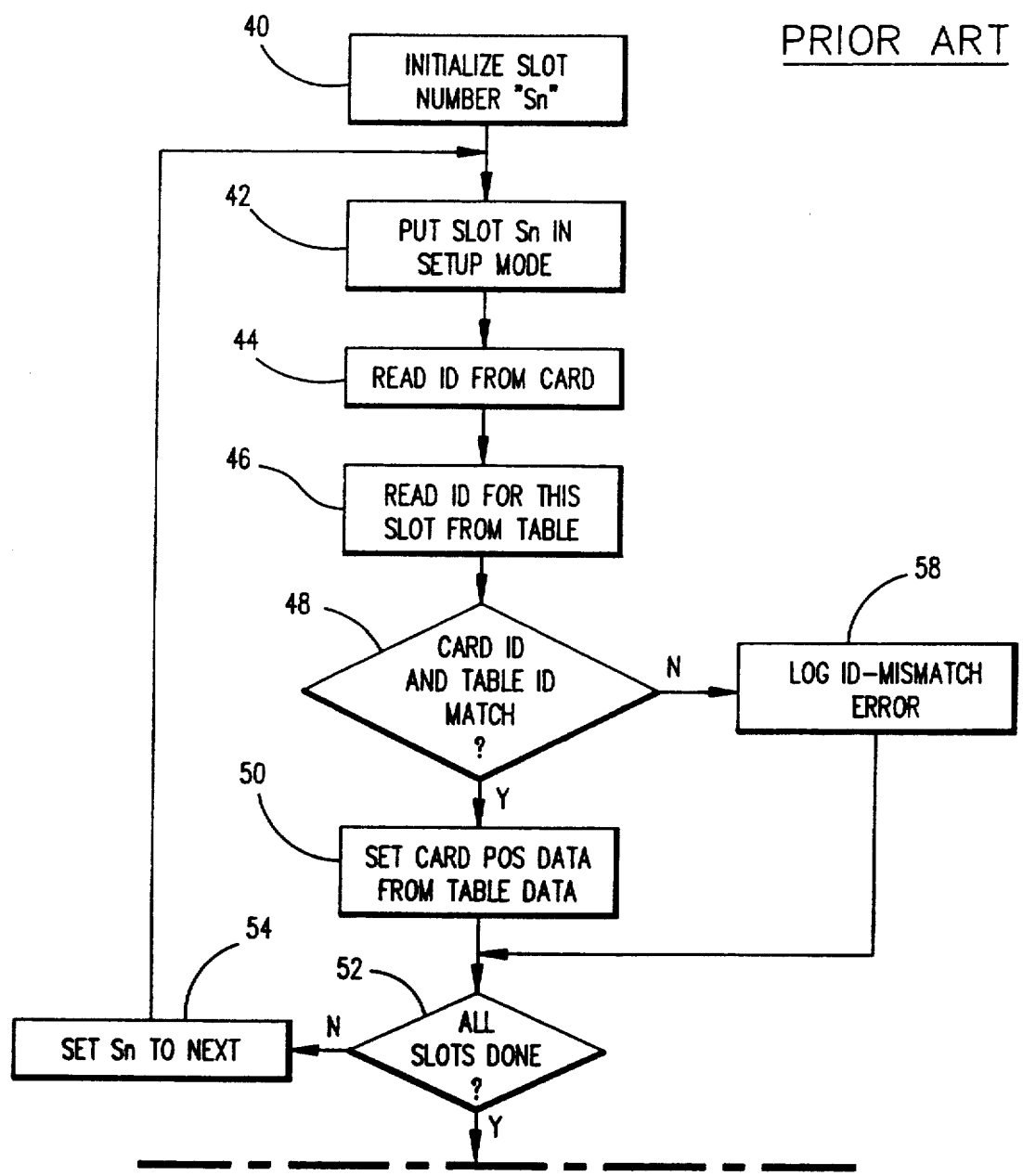
FIG. 2 is a flow chart of a portion of the prior art being improved upon.
Figure 2B:
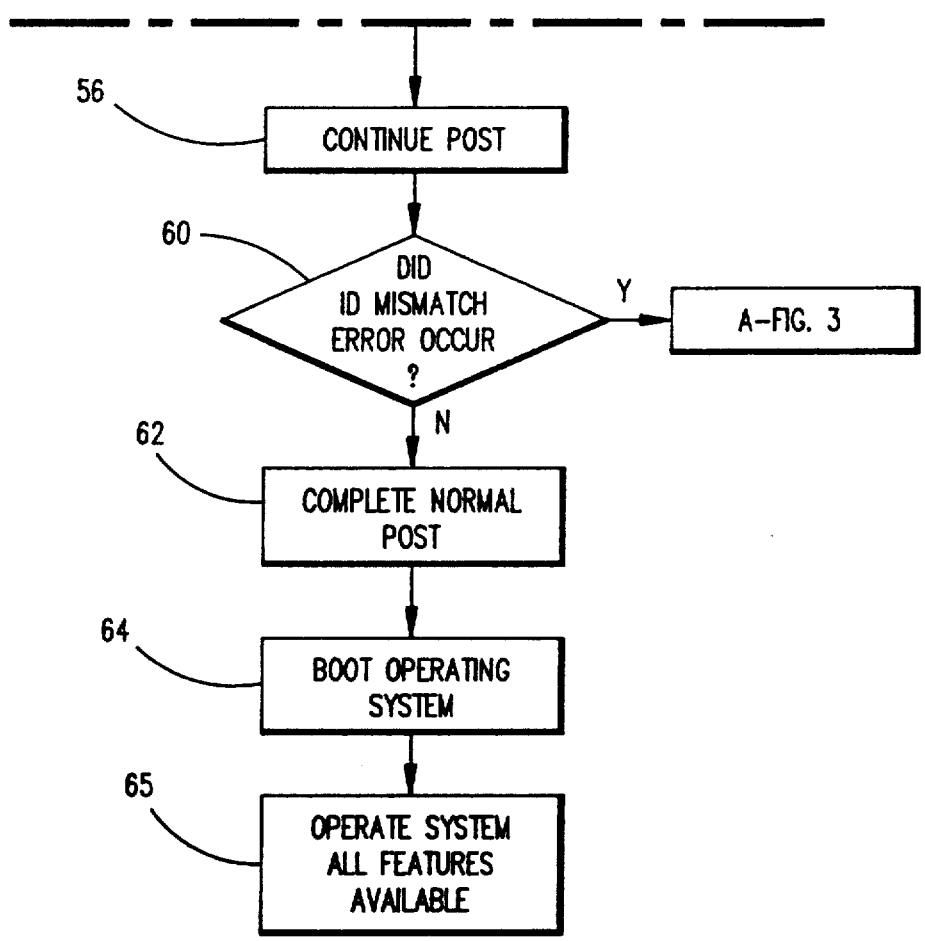

A mechanism is provided which records which slots contain feature cards or adapters with IDs that correctly correspond to the IDs in POS table 19. This mechanism also identifies which slots generate an ID mismatch error. To be able to correctly identify which slot or slots are involved in a card ID mismatch, a word 101 of RAM 14 is used. This word is referred to as SLOTFLAG. Each bit in SLOTFLAG 101 corresponds to a different slot. Any unused bits can be reserved for expansion. The original functions of FIG. 2 are modified to support the SLOTFLAG designator. This modification is shown in FIG. 4.

Figure 3:
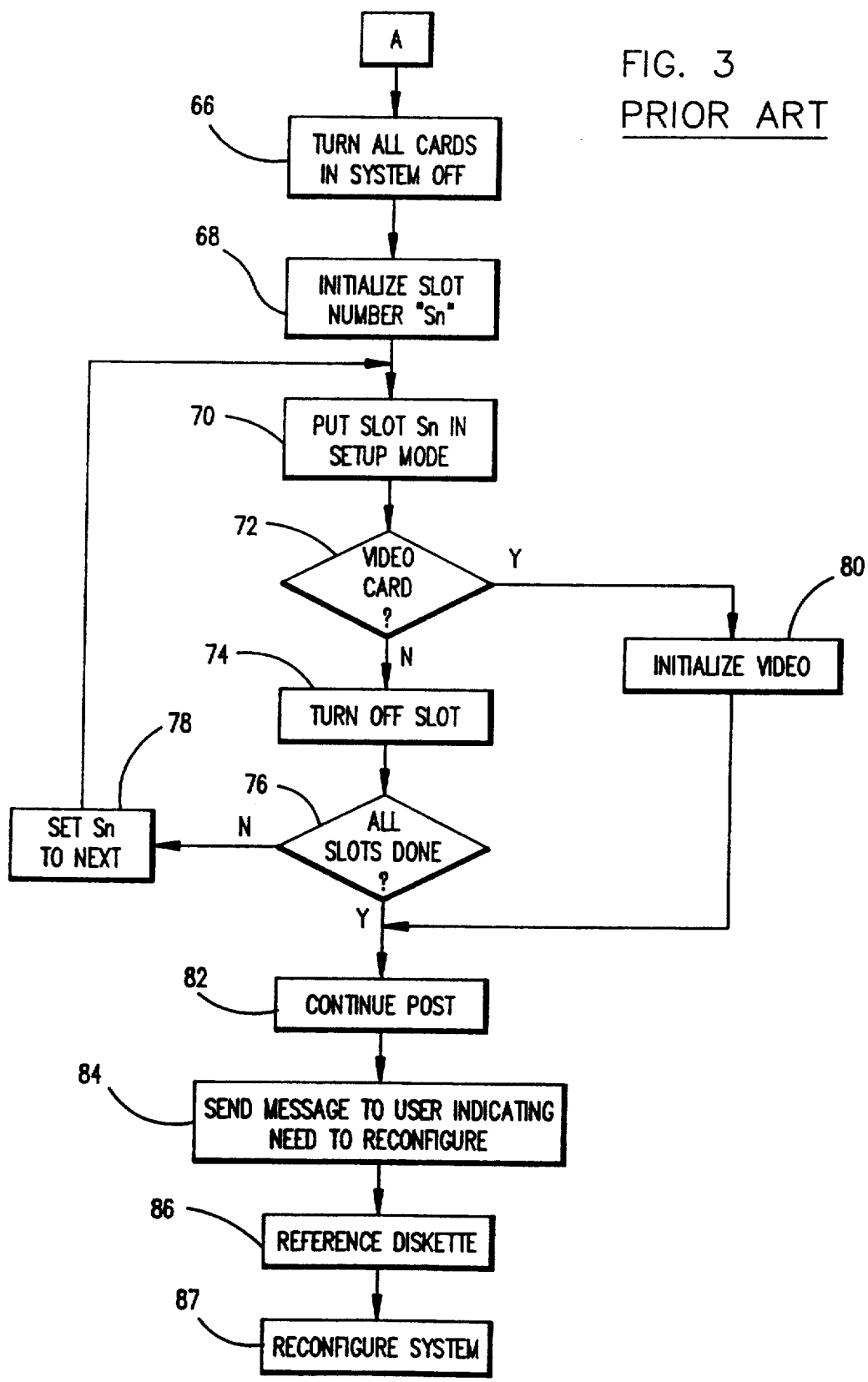
FIG. 3 is a flow chart of another portion of the prior art being improved upon.
Figure 5:
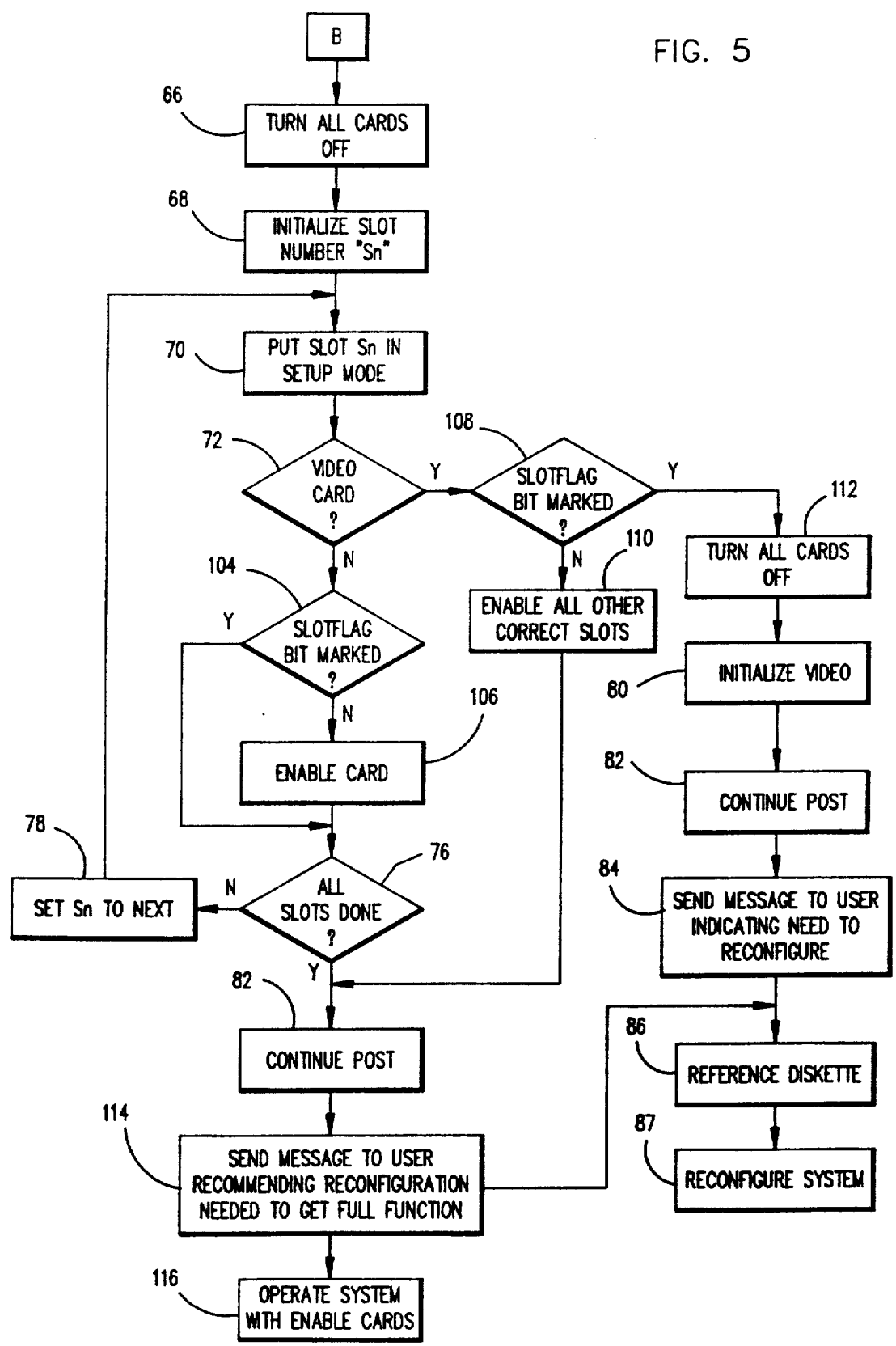
FIG. 5 is a flow chart of another portion of the invention.

When a card slot is found to have a feature card with an ID that does not match the ID stored in table 19, the bit position corresponding to the failing slot is set in SLOTFLAG. The functions of FIG. 3 are modified as shown in FIG. 5 to use the SLOTFLAG designator. This allows for all correctly configured slots to remain enabled if a correctly configured video card is present. All correctly configured slots will remain enabled if no video card is present. If a video card is found which also caused a card ID mismatch error, then all slots but the video slot are disabled. This disabling insures that no addressing conflicts occur.

Figure 4:
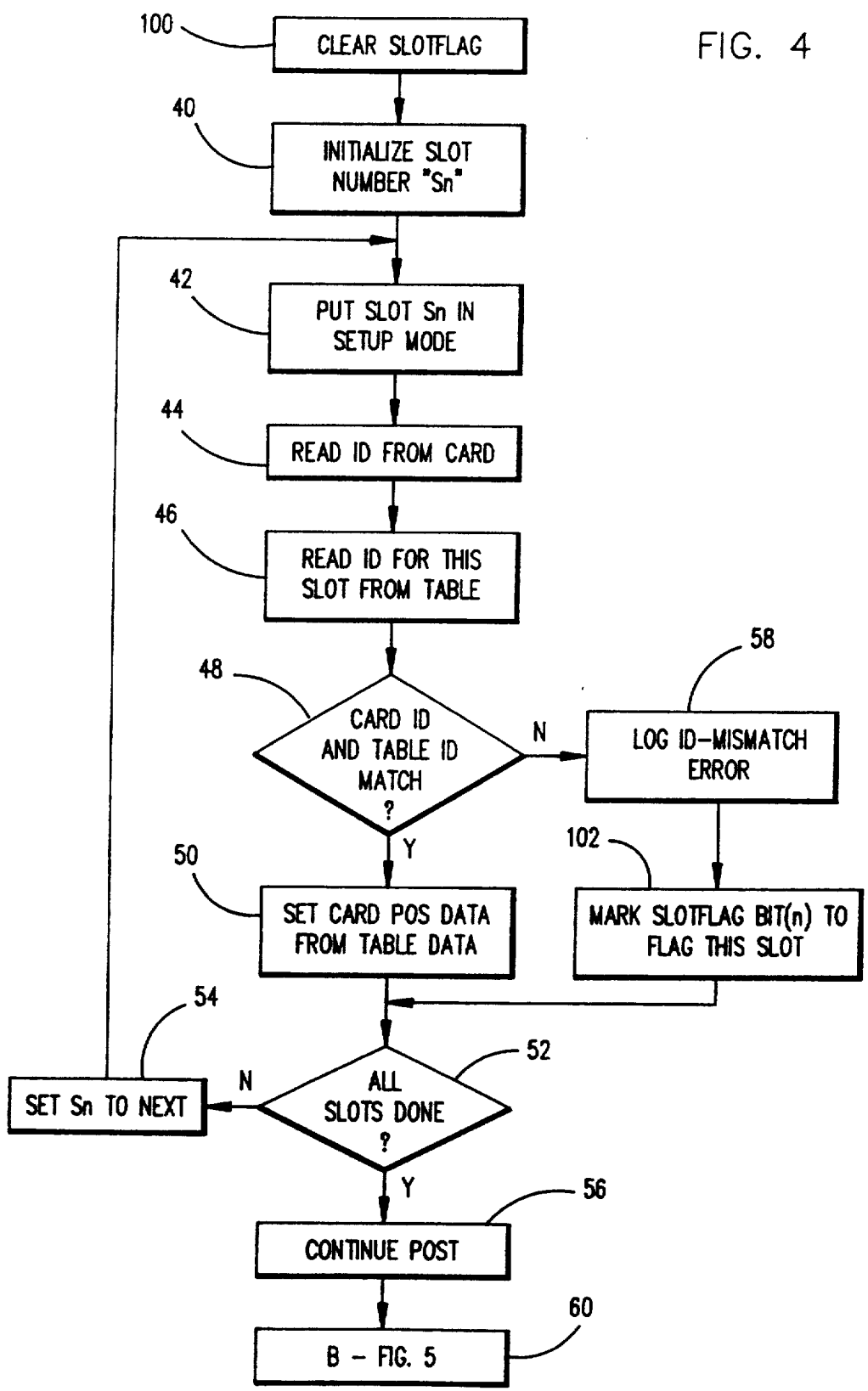
FIG. 4 is a flow chart of a portion of the invention.

FIGS. 4 and 5 show the improved operations of the invention. Those operations which are the same as those of the prior art are indicated with the same references as used in FIG. 2 and 3. New steps are indicated with references 100 and higher. Referring now to FIG. 4, POST routine 32 begins the improved operation with step 100 accessing SLOTFLAG 101 and clearing it by setting all bits to indicate that no adapter has been added, removed or moved. Except for step 102, all the remaining steps in FIG. 4 occur as in the prior art process previously described. Step 102 occurs when there is an ID mismatch error and it sets or marks the bit in SLOTFLAG 101, which bit corresponds to the slot number where the error arose, to indicate an error occurred in such slot. Later, as result of such error having been logged in step 58, step 60 branches to step 66 (FIG. 5).

Step 66 first disables all the adapters. Then, a series of steps places all the adapters in a setup mode and either enables or disables such adapters in accordance with the non-occurrence or occurrence of an ID mismatch associated therewith. For a non-video card, step 104 checks to see if the corresponding SLOTFLAG bit has been marked. If it has not been marked, step 106 enables such adapter. If it has been marked, step 106 is bypassed leaving such card disabled from step 66. If the card is a video card, step 108 checks to see if the corresponding SLOTFLAG bit has been marked. If such bit has not been marked, step 110 enables all other correct slots. If the bit in SLOTFLAG corresponding to the video card has been marked, step 108 branches to step 112 which turns all other cards off. Then, steps 80-87 are performed to reconfigure the system. After all slots have been checked, and upon completion of step 110, control passes to step 82 where any remaining steps of the POST are performed and a message is sent to the user in step 114 recommending that the system be reconfigured in order to get the full function from all adapters. The user can then choose to reconfigure the system by steps 86 and 87 or operate the system in step 116 using only those adapters that are enabled. Step 116 can not be done with the prior art system described above.

In summary, the invention enhances system operation in the situation where feature cards have been added to, removed from, or moved within the computer system. For minor changes, such as a printer port addition, no loss of system function is experienced. All previously operational feature cards will continue to be so. Before the invention, the system would have no operational cards except possibly the error path video adapter and hence be unusable until reconfiguration.

It should be apparent to those skilled in the art that many changes can be made in the details and arrangements of steps and parts without departing from the scope of the invention as defined in the appended claims.

What is claimed is:

1. In a data processing system (DPS) having a plurality of expansion slots for receiving a plurality of adapter cards by means of which a plurality of different types of hardware devices can be connected into said system; each adapter card having registers for storing (1) an adapter ID uniquely identifying such card, (2) an enabling bit controlling enablement and disablement of such card, and (3) programmable option select (POS) data defining system resources assigned for use with such adapter card and device connected thereto; a microprocessor; a memory system for storing an operating system; a bus network interconnecting said slots, said memory system and said microprocessor; and a non-volatile memory connected to said bus network for storing POS information including (1) configuration IDs indicating which adapter cards are configured with which slots, and (2) said POS data for each adapter card, said POS information having been stored in said non-volatile memory when said DPS was most recently configured; the improvement comprising:

memory means for storing a test result flag, said test result flag comprises a plurality of bits, each bit being selectively settable;

power-on test means connected to said network and operative, upon said data processing system being powered on, to scan said slots, to determine if any adapter card has been changed by addition to or removal from a slot, and to set said test result flag;

selection means operative, as a result of said test result flag being set, to present a user with a choice of either reconfiguring said DPS or placing said DPS in normal operation, when an adapter card has been changed; said test means is operative to compare all configuration IDs stored in said non-volatile memory with all corresponding adapter IDs read from corresponding slots and detect whether or not a card has been changed, to set said bits of said test result flag in accordance with the results of said comparing and indicate a match or a mismatch between each configuration ID and corresponding adapter ID, and, in response to the status of said bits in said test result flag, to disable an adapter card when the corresponding bit indicates a mismatch, to enable an adapter card when the corresponding bit indicates a match, and, after enabling an adapter card, to load corresponding POS data into such adapter card so that such adapter card is usable after said operating system is booted up;

and means operative, in response to a user choosing to place said DPS in normal operation, to boot up said operating system and thereafter run said DPS without reconfiguring said DPS.

2. A data processing system according to claim 1 wherein:

said bits in said test result flag correspond in number to the number of said slots, each bit corresponding to a different one of said slots.

3. A data processing system according to claim 2 wherein said selection means scans all of said bits in said test result flag and presents the user with said choice when one of said bits indicates a mismatch.

4. A data processing system according to claim 3 comprising a video adapter card connected to a display for visually presenting said choice to the user.

5. The method of operating a data processing system (DPS) having a plurality of expansion slots for receiving a plurality of adapter cards by means of which a plurality of different types of hardware devices can be connected into said system; each adapter card having registers for storing (1) an adapter ID uniquely identifying such card, (2) an enabling bit controlling enablement and disablement of such card, and (3) programmable option select (POS) data defining system resources assigned for use with such adapter card and device connected thereto; a microprocessor; a memory system for storing an operating system; a bus network interconnecting said slots, said memory system and said microprocessor; and a non-volatile memory connected to said bus network for storing POS information including (1) configuration IDs indicating which adapter cards are configured with which slots, and (2) said POS data for each adapter card, said POS information having been stored in said non-volatile memory when said DPS was most recently configured; wherein said method comprises;

storing a test result flag in said memory means, said test result flag comprising a plurality of selectively settable bits;

scanning said slots when said DPS is powered on, to determine if any adapter card has been changed by addition to or removal from a slot, and setting said test result flag when at least one of said cards has been so changed;

presenting a user with a choice, as a result of said test result flag being set, of either reconfiguring said DPS or placing said DPS in normal operation;

in response to the status of said bits in said test result flag, disabling an adapter card when the corresponding bit indicates a mismatch, enabling an adapter card when the corresponding bit indicates a match, and, after enabling an adapter card, loading corresponding POS data into such adapter card so that said adapter card can be used after said operating system is booted up;

and booting up said operating system, in response to a user choosing to place said DPS in normal operation, and thereafter running said DPS without reconfiguring said DPS.

6. The method according to claim 5 wherein said bits in said test result flag correspond in number to the number of said slots, each bit corresponding to a different one of said slots; and said method comprises comparing all configuration IDs stored in said nonvolatile memory with all corresponding adapter IDs read from corresponding slots to detect whether or not a card has been changed, and setting said bits of said test result flag in accordance with the results of said comparing to indicate a match or a mismatch between each configuration ID and corresponding adapter ID.

7. The method according to claim 6 comprising scanning all of said bits in said test result flag and presenting the user with said choice when one of said bits indicates a mismatch.

8. The method according to claim 7 comprising connecting a video adapter card and a display to one of said slots, and visually presenting said choice on said display.

* * * * *